Patented Nov. 20, 1945

2,389,147

UNITED STATES PATENT OFFICE 2,389,147

4' METHOXY 5 HALOGENO DIPHENYLAMINO 2' CARBOXYL COMPOUND AND PROCESS FOR PRODUCING THE SAME

Ernst A. H. Friedheim, New York, N. Y., and Ernst Bergmann, Rehovoth, Palestine

No Drawing. Application November 20, 1943,
Serial No. 511,110

7 Claims. (Cl. 260—519)

This invention relates to 4' methoxy 5 halogeno diphenyl amino 2' carboxyl compounds, which are useful as intermediates for producing N-substituted 9-amino-2-methoxy-6-halogeno-acridines of the type corresponding to the formula

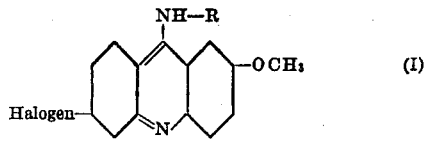

wherein R stands for an organic basic radical containing nitrogen. It has particular relation to new and useful intermediate compounds, from which such acridines can be prepared. It further relates to methods of producing said intermediate compounds.

It has been known to use as a starting material for the synthesis of substances of type I the 4'-methoxy-5-chloro-diphenylamine - 2 - carboxylic acid of the formula

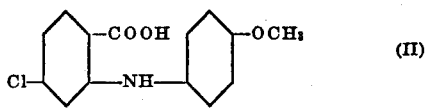

This compound was converted into 6,9-dichloro-2-methoxy-acridine of the formula

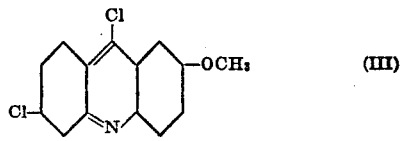

which could be condensed with suitable substituted diamines.

It has now been found that 6,9-dichloro-2-methoxy-acridine of the Formula III can be conveniently obtained from certain new compounds, i. e. the more easily available 4'-methoxy-5-halogeno-diphenyl-amine-2'-carboxylic acids, e. g. the 4'-methoxy-5-chloro-diphenylamine-2'-carboxylic acid of the formula

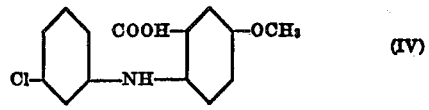

preferably by the action of phosphorus oxychloride. It is surprising that this reaction proceeds exclusively in the sense of forming Compound III, and no formation of the isomeric chloroacridine

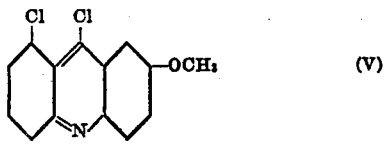

takes place.

It has been found that the 4'-methoxy-5-halogeno-diphenylamine-2'-carboxylic acids can be obtained by condensation of 3-halogeno-aniline with a 6-halogeno-3-methoxy benzoic acid. Analogously, the esters of such an acid can be condensed with 3-halogeno-aniline.

The new acids corresponding to Formula IV can be converted into their derivatives, such as the acid chloride (M. P. 84°–85° C.), the methyl or ethyl ester, and the amide or N-substituted amides. In particular, the ε-diethylamino-pentyl-β-amide can be prepared from the acid chloride or one of the esters or by heating the acid (IV) with the base to 150° C. The compound thus formed has an M. P. of 178° C. Treated with phosphorus oxychloride, it gives 2-methoxy-6-chloro-9-(ε-diethylamino-pentyl-β-amino)- acridine. Surprisingly, here again only one of the theoretically possible routes of cyclisation is followed.

The 6-halogeno-3-methoxy-benzoic acids may be prepared according to known methods.

*Example I.*—11 g. of 6-bromo-3-methoxy-benzoic acid, 5.5 cc. of 3-chloroaniline, 7 g. of potassium carbonate and 0.5 g. of copper powder were heated for 3 hours in 80 cc. of boiling iso-amyl alcohol. The solvent was removed by steam distillation and the violet residual solution filtered and precipitated with dilute sulfuric acid. The reaction product was an oil which crystallized very quickly and was then triturated with cold methyl alcohol. The crude yellowish product weighed 16 g. and was purified by recrystallization from butyl alcohol. Clusters of needles were thus obtained which had an M. P. of 181° C. The reaction takes place according to the scheme:

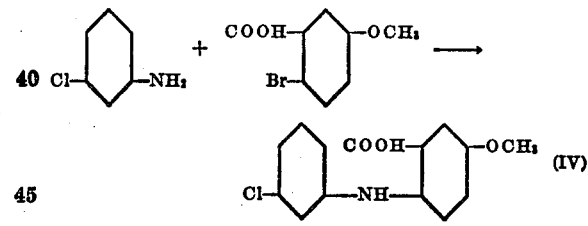

8.5 g. of the acid (IV) were boiled with 30 cc. of phosphorus oxychloride for 2 hours. 15 cc. of the chloride were distilled off under slightly reduced pressure and the residue treated with ice. The oil which separated at first, solidified over night and was isolated and added to a mixture of 10 g. of sodium carbonate, 50 cc. of water, 20 g. of ice, and 5 cc. of 28% ammonia solution, while stirring and cooling with ice water. The reaction product was filtered, dried and dissolved in boiling benzene. Upon the addition of an equal volume of ligroine (70°–90° C.) to the filtered solution, a small amount of resinous material appeared, which was collected by filtration. On cooling, the clear solution deposited a crystalline precipitate which was proven by its M. P. (160° C.) to be 2-methoxy-6,9-dichloro-acridine of the above Formula III. Compound III thus obtained may be converted into a compound of the formula

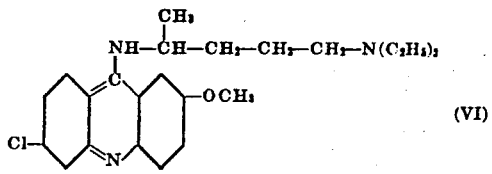

by reacting compound III with 5-diethylamino-2-amino pentane according to known methods, preferably by heating the latter with a solution of Compound III in phenol.

Example II.—1.6 g. of 3-methoxy-6-chloro-benzoic acid and 1.1 cc. of 3-chloro-aniline, 2 g. of potassium carbonate and a trace of copper powder were boiled for 3 hours in 25 cc. of iso-amyl alcohol. By further proceeding according to the directions given in the above Example I the acid corresponding to the above Formula IV is obtained.

Example III.—8.4 g. of 4'-methoxy-5-chloro-diphenyl-amine-2'-carboxylic acid (IV), as prepared in Example I or II, were mixed with 50 cc. of ligroine and 7 g. (theoretical quantity 6.3 g.) of phosphorus pentachloride. When the spontaneous reaction had subsided, one heated for 30 minutes on the water-bath, added another 25 cc. of ligroine and cooled with ice. A thick crystallisate appeared which was filtered and recrystallized from the minimum quantity of ligroine. Beautiful needles of the acid chloride are thus obtained in a yield of 6 g.

5 g. of this acid chloride were heated for 30 minutes in 100 cc. of benzene with 3 g. of 5-diethylamino-pentylamine-(2) in order to form the corresponding amide. Then 6 cc. of phosphorus oxychloride were slowly added and the mixture was boiled for 7 hours. The benzene was decanted off from the black oil, which had precipitated and the latter dissolved in alcohol and mixed with 3 times its volume of ether. On standing, a precipitate appeared which was collected after 12 hours. Yield: 5 g. This product, which melted under evolution of some gaseous substance at 160° C., resolidified and melted again at 250° C., is an acridine derivative of the above Formula VI. In this process a compound of the formula

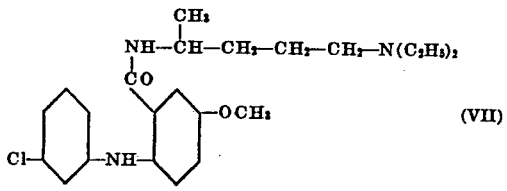

is first formed from the acid chloride, and this compound is then cyclised under the action of phosphorus oxychloride to (VI).

The acid chloride may also be prepared by treatment with thionyl chloride (3 cc. per gram) on the water-bath for 1 hour preferably after diluting the reaction mixture with an equal volume of carbon tetrachloride.

Example IV.—Esters of acid (IV) can be prepared by the usual methods (e. g. methylalcoholic sulphuric acid), or by direct synthesis in the following way:

17 g. of methyl-6-chloro-3-methoxy-benzoate, a crystalline substance (needles from methylalcohol), 11 cc. 3-chloro-aniline, 20 g. of potassium carbonate or 30 g. of anhydrous potassium acetate and some precipitated copper powder were boiled for 3 hours in 250 cc. of iso-amyl alcohol. The reaction product was filtered from the inorganic salts, shaken with water, dried and distilled in vacuo (5 mm.). After the removal of the solvent and of a small amount of excess 3-chloro-aniline, the methyl ester boiled in vacuo without decomposition and crystallised on trituration with methyl alcohol. It formed a bright-yellow crystalline powder.

5.8 g. methyl 4'-methoxy-5-chloro-diphenylamine-2'-carboxylate and 3.5 g. (theoretical amount 3.2 g.) ε-diethylamine-β-pentylamine were heated at 130° C. for 4 hours in an open vessel. The product was a resin, which crystallised on trituration with acetone. From isobutyl alcohol broad yellowish needles, M. P. 178–179° were obtained.

Example V.—10 g. of the acid (IV) prepared in accordance with the above Example II were converted into the acid chloride by boiling in 100 cc. of benzene with 80 g. of phosphorus pentachloride for about one hour. The acid chloride was then converted into the corresponding acridone by adding to the solution cooled to about 10° C. 10 g. of aluminum chloride in portions with stirring. After a few hours of stirring the reaction was completed. The mass was then poured to ice, acidified with concentrated hydrochloric acid, and the benzene removed. The 2-methoxy-6-chloro-acridone was separated by filtering and converted into 2-methoxy-6,9-dichloroacridine by means of phosphorus pentachloride.

Example VI.—11 g. 6-bromo-3-methoxy-benzoic acid, 5.0 cc. of 3-fluoro-aniline (a water-white liquid of B. P. 186°, obtained preferably by catalytic reduction of 3-nitro-fluoro-benzene in methyl alcohol in presence of Raney nickel), 7 g. of potassium carbonate and 0.5 g. of copper were heated for 3 hours in 100 cc. of boiling iso-amyl alcohol. The solvent and the slight excess of 3-fluoro-aniline employed were removed by steam distillation and the dark residual solution boiled with charcoal, filtered and precipitated with dilute sulfuric acid. The 4'-methoxy-5-fluoro-diphenylamine-2'-carboxylic acid formed a bright yellow powder, which could be obtained in form of well-shaped yellow crystals by recrystallisation from butyl alcohol.

7.8 g. of the acid were mixed with 7 g. of phosphorus pentachloride in 50 cc. of ligroine. After the spontaneous reaction had subsided, the reaction mixture was heated for 30 minutes on the water-bath and the reaction product was cooled to ice temperature. The acid chloride separated as a heavy crystalline precipitate and was obtained in 7 g. yield. These 7 g. were heated for 30 minutes in 100 cc. of benzene with 5 g. of 5-diethyl-amino-pentylamine-(2) and then, after cautious addition of 9 cc. phosphorus oxychloride, for further 7 hours. The heavy bottom layer was isolated by decantation, dissolved in alcohol and additioned with ether. 6.5 g. of the desired acridine derivative were thus obtained in form of the hydrochloric acid salt. Crystallisation from butyl alcohol gave orange-yellow crystals, which dissolved in concentrated sulphuric acid with intense green fluorescence.

As will be understood by those skilled in the art, various modifications of the present invention, as hereinbefore set forth, may be made without departing from the spirit of the invention as defined in the appended claims.

We claim:
1. As a new compound, 4'-methoxy-5-halogeno-diphenylamine-2'-carboxylic acid.
2. As a new compound, 4'-methoxy-5-chloro-diphenylamine-2'-carboxylic acid.
3. As a new compound, 4'-methoxy-5-halogeno-diphenylamine-2'-carboxylic acid chloride.
4. As a new compound, a chemical substance of the formula

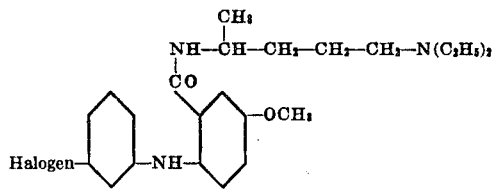

5. A method of preparing 4'-methoxy-5-halogeno - diphenylamine - 2'-carboxylic acid, said method comprising reacting in the heat in the presence of a solvent 3-halogeno-aniline with a 6-halogeno-3-methoxy-benzoic acid.
6. A method of preparing 4'-methoxy-5-chloro-diphenylamine-2'-carboxylic acid, said method comprising reacting in the heat in the presence of a solvent 3-chloro-aniline with 6-chloro-3-methoxy-benzoic acid.
7. A new compound corresponding to the formula

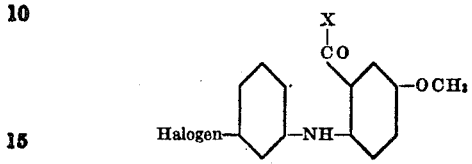

wherein X is a radical selected from the group consisting of -OH, halogen, -O-alkyl and amino radicals.

ERNST A. H. FRIEDHEIM.
ERNST BERGMANN.